US007890090B2

(12) United States Patent
Hansen et al.

(10) Patent No.: US 7,890,090 B2
(45) Date of Patent: Feb. 15, 2011

(54) DYNAMIC MOBILE CALL FORWARDING BY LOCAL AREA SERVICE DISCOVERY

(75) Inventors: Mark D. Hansen, Buffalo Grove, IL (US); Julien Pince, Toulouse (FR)

(73) Assignee: Motorola Mobility, Inc., Libertyville, IL (US)

(*) Notice: Subject to any disclaimer, the term of this patent is extended or adjusted under 35 U.S.C. 154(b) by 1140 days.

(21) Appl. No.: 11/450,762

(22) Filed: Jun. 9, 2006

(65) Prior Publication Data

US 2007/0287438 A1    Dec. 13, 2007

(51) Int. Cl.
*H04M 3/42*    (2006.01)
(52) U.S. Cl. .................................. 455/417; 455/414.1
(58) Field of Classification Search ............. 455/414.1, 455/414.3, 417, 445, 456.2; 370/352
See application file for complete search history.

(56) References Cited

U.S. PATENT DOCUMENTS

| | | |
|---|---|---|
| 6,937,713 B1 | 8/2005 | Kung |
| 7,035,935 B1 | 4/2006 | Voois et al. |
| 2005/0163108 A1 | 7/2005 | Moore |
| 2005/0186948 A1 | 8/2005 | Gallagher |
| 2005/0186960 A1 | 8/2005 | Jiang |
| 2005/0195802 A1 | 9/2005 | Klein |
| 2006/0077956 A1 | 4/2006 | Saksena et al. |
| 2006/0203986 A1* | 9/2006 | Gibson .................. 379/211.02 |

OTHER PUBLICATIONS

International Search Report PCT/US2007/064865 dated Jan. 1, 2008.
Strater, J., et al., Seamless Mobility Between Home Networks and Cable Services, Motorola, Inc., May 2005.
CINGLUAR, FastForward User Guide, Motorola V60, V70, 120t, T720, C331t Series, 07FFMOTMANUAL, Oct. 2003.

* cited by examiner

*Primary Examiner*—Sam Bhattacharya
(74) *Attorney, Agent, or Firm*—Ingrassia Fisher & Lorenz, P.C.

(57) ABSTRACT

A mobile communication device as described herein is configured to support a wireless service discovery routine within a wireless local area. The service discovery routine identifies compatible devices in the vicinity of the mobile device, where the compatible devices represent potential forward-to devices for purposes of call forwarding for the mobile device. The mobile device receives one or more potential forward-to telephone numbers during the service discovery routine, selects a designated forward-to telephone number, and generates a call forwarding request that identifies the designated forward-to telephone number. The service discovery routine is carried out using one wireless communication protocol, and the call forwarding request is carried out using a different wireless communication protocol (e.g., a cellular protocol).

25 Claims, 4 Drawing Sheets

DYNAMIC MOBILE CALL FORWARDING BY LOCAL AREA SERVICE DISCOVERY

TECHNICAL FIELD

The present invention relates generally to mobile communication techniques and technologies. More particularly, the present invention relates to call forwarding techniques and technologies suitable for use with mobile communication devices.

BACKGROUND

Call forwarding is a popular service offered by both mobile and fixed line telecommunication providers. When call forwarding is active, incoming calls for one telephone number are redirected to another telephone number. A considerable limitation of conventional call forwarding services relates to the manner in which the forward-to telephone number is configured. With these services, the user manually specifies one or more static forward-to telephone numbers (typically using the keypad or user interface of the device), or the user provides a default forward-to telephone number to the service provider for use whenever the user activates the call forwarding feature. In either situation, the user is unable to configure call forwarding automatically to a telephone device in the immediate area without some manual operation, especially if the user does not already know the telephone number of that device.

Cellular service providers may offer call forwarding services such that incoming calls for a cellular telephone are redirected a landline telephone. In this regard, it may be possible for the user deploy a docking station for the cellular telephone, where the docking station automatically commands the cellular network to forward calls to a designated telephone number (which is typically the home or office telephone number of the user). Although this appears to be a convenient solution, the user must still configure the call forwarding service to designate the forward-to number. In addition, this solution requires a docking station, which increases clutter in the user's home or office and which represents an added expense for the user and/or the service provider.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques and technologies related to wireless data communication systems, signaling, network control, discovery protocols, and other functional aspects of the example systems (and the individual operating components of the example systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 2:
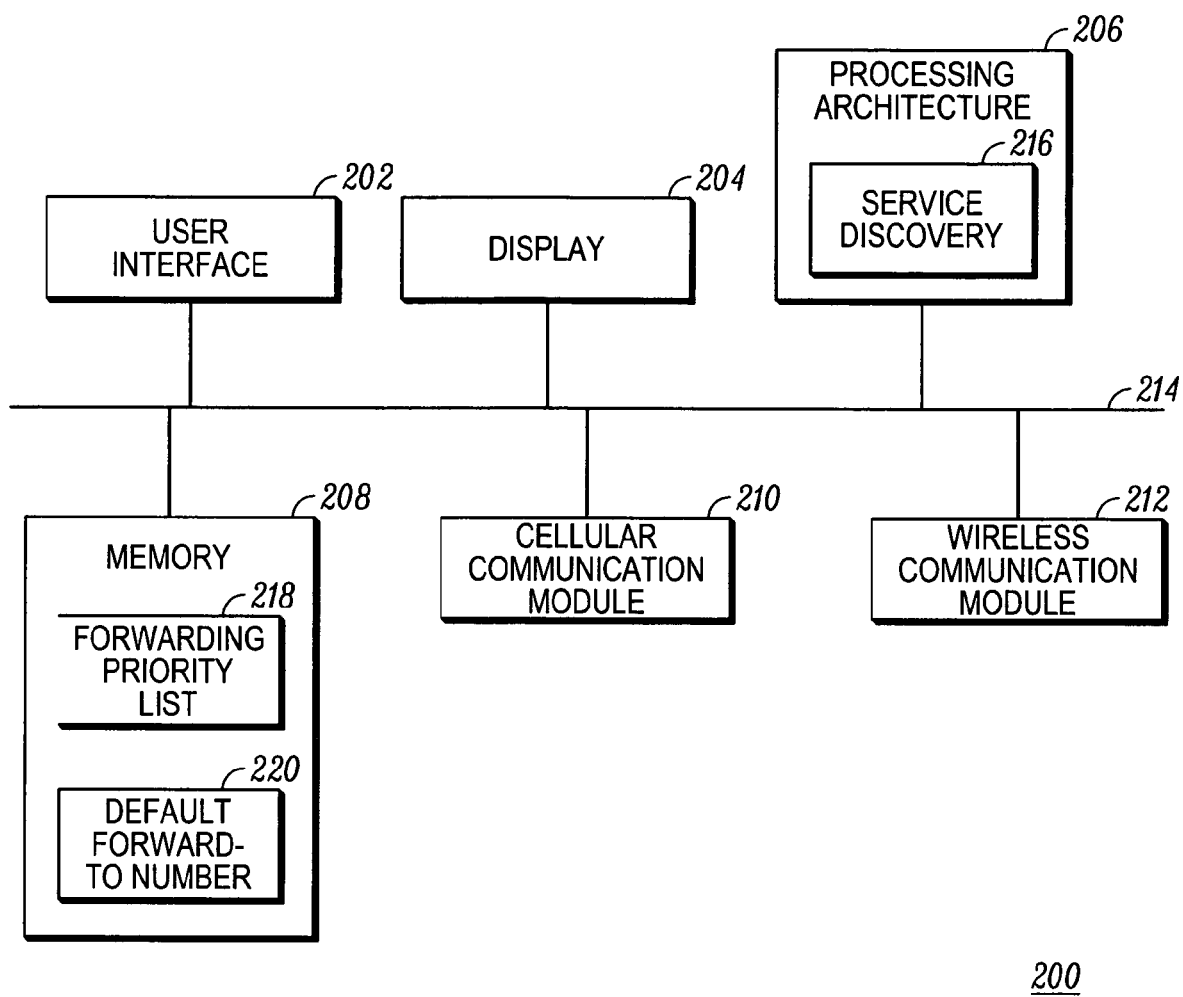
FIG. 2 is a schematic representation of an example mobile device configured to support call forwarding.

The following description may refer to elements or features being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the schematic shown in FIG. 2 depicts one example arrangement of elements, additional intervening elements, devices, features, or components may be present in an actual embodiment (assuming that the functionality of the device is not adversely affected).

Figure 1:
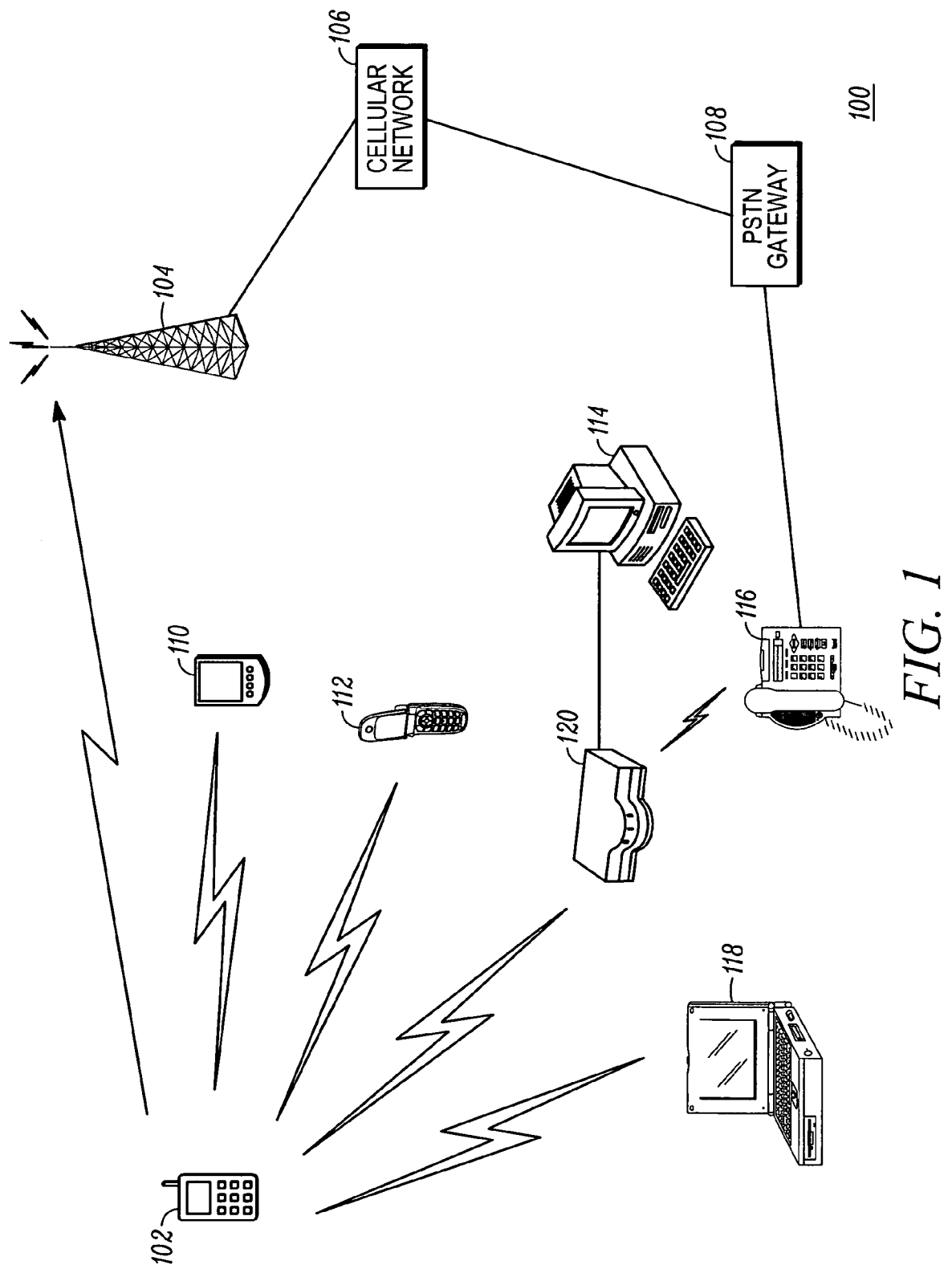
FIG. 1 is a schematic representation of an example operating environment for mobile device call forwarding.

FIG. 1 is a schematic representation of an example operating environment 100 for mobile device call forwarding. Operating environment 100 includes a mobile device 102, which may be realized as a wireless telephone, a smart phone, a personal digital assistant ("PDA"), a pocket personal computer, a portable video game device, or any suitable mobile device having telecommunication or data communication functionality. Operating environment 100 may include or cooperate with a cellular network infrastructure that supports cellular telecommunication features of mobile device 102. For example, operating environment 100 may include cell sites or base stations 104 and a cellular network 106 (which may include any number of base station controllers, mobile switching centers, and other conventional components). In example embodiments, the cellular network infrastructure may be configured to support any number of cellular telecommunication systems, protocols, or architectures, including, without limitation, GSM, CDMA, 3G, or systems, protocols, or architectures developed in the future. Conventional operating features and components of cellular communication systems will not be described in detail herein.

Operating environment 100 may also include or cooperate with a public switched telephone network ("PSTN") that supports conventional landline telecommunication techniques and technologies. In this regard, operating environment 100 is depicted with a PSTN gateway 108, which is coupled to cellular network 106 in this example. As described in more detail below, this infrastructure enables cellular network 106 to route incoming calls through PSTN gateway 108 to a landline telephone device if so desired. Conventional operating features and components of PSTN systems will not be described in detail herein.

Traditional mobile and fixed line telecommunication services have no provision for allowing a mobile device user to dynamically forward incoming calls to another device in the immediate area with little or no user configuration. Moreover, such traditional services are unable to dynamically forward incoming calls without prior knowledge of the forward-to telephone number. In contrast, operating environment 100 and the example systems and mobile devices described herein allow a user to easily discover available devices (fixed line devices and/or mobile devices) in a local area and initiate call forwarding to a destination device.

An increasing number of mobile devices are integrating IEEE 802.11 functionality, BLUETOOTH Personal Area Network ("PAN") functionality, and/or other local area wireless transport mechanisms. In the example embodiment, mobile device 102 supports one or more of these local area wireless communication protocols, which can be utilized to discover other compatible devices in the immediate vicinity, where such devices may include, without limitation: a PDA 110; a mobile telephone 112, which may be a cellular telephone, a cordless POTS telephone, or the like; a desktop computer 114; a fixed line telephone 116; a portable computer 118; or any device, system, or apparatus having telecommunication or data communication functionality. These devices, which are located in the vicinity of mobile device 102 in this example, are configured to communicate with mobile device 102 using a suitable local area wireless communication mechanism.

In example embodiments, operating environment 100 may include or cooperate with one or more wireless network infrastructure components, e.g., a wireless router 120, a wireless access point, a wireless switch, a WLAN card, or the like. Here, wireless router 120 may be utilized to establish the wireless network in the vicinity of mobile device 102 such that desktop computer 114, fixed line telephone 116, and/or other devices can communicate with mobile device 102 using the designated local area wireless communication protocol.

As described in more detail below, mobile device 102 is suitably configured to discover other devices in operating environment 100 using an appropriate service discovery routine. Thereafter, mobile device 102 can present a list of available forward-to telephone numbers to the user, and mobile device 102 can transmit a call forwarding request to cellular network 106 upon selection of a desired forward-to telephone number. As an example, assume that a user of mobile device 102 enters a conference room that is equipped with a speakerphone, and the user wishes to forward incoming calls intended for mobile device 102 to the speakerphone. Upon entering the conference room, mobile device 102 may perform a scan (using an 802.11 network, BLUETOOTH wireless technology, or the like) using a service discovery routine. The scan may be initiated automatically upon detection of a local wireless transport mechanism in the area, the scan may be triggered by the user of mobile device 102, the scan may be triggered in response to certain operating conditions, or the like. The service discovery routine may be compliant with a known protocol such as, without limitation: Universal Plug and Play ("UPnP"), Zero Configuration Networking, the BONJOUR technology provided by Apple Computer, Inc., or other types of IP multicast-based discovery methods. These service discovery protocols are IP-based, and they are designed to leverage a local area IP network, e.g., a Wi-Fi network. Alternatively, the service discovery routine may be a proprietary protocol that need not be governed by any standards or published specifications (for example, if operating environment 100 is a home network environment). The service discovery routine enables mobile device 102 to discover potential forward-to devices in the vicinity of the conference room, including the speakerphone in this example. Using the same service discovery routine, mobile device 102 may also obtain additional information from the potential forward-to devices, such as their telephone numbers, a device identifier such as an IP address, descriptive text, or the like.

In this example, mobile device 102 presents a list of available forward-to devices to the user; this list may include the text descriptions and/or the telephone numbers of the potential forward-to devices. The user can then manipulate the user interface of mobile device 102 to select the speakerphone in the conference room, which prompts mobile device 102 to generate and transmit a call forwarding request to cellular network 106. In practice, the call forwarding request is formatted for processing by the particular service provider network that supports mobile device 102. In this regard, the call forwarding request instructs cellular network 106 to redirect incoming calls for mobile device 102 to the speakerphone in the conference room. If, for example, fixed line telephone 116 represents the speakerphone, then an incoming call received by the cellular operator will be routed through PSTN gateway 108 to fixed line telephone 116, as depicted in FIG. 1.

FIG. 2 is a schematic representation of an example mobile device 200 configured to support call forwarding as described herein. Mobile device 102 in operating environment 100 (see FIG. 1) may employ the arrangement of mobile device 200. Mobile device 200 may be realized in the form of a mobile telephone, a PDA having telephone functions, a mobile computer device having telephone functions, a digital media player having telephone functions, or any suitably configured device having telephone features. Mobile device 200 includes a call forwarding system or architecture that is configured to support the call forwarding features described herein. In this example, mobile device 200 generally includes a user interface 202, a display element 204, a processing architecture 206, an appropriate amount of memory 208, a cellular communication module 210, and a wireless communication module 212. Some or all of these elements may be coupled together with a bus 214 or any suitable interconnection arrangement or architecture. An example embodiment of mobile device 200 may include additional elements, components, features, and/or functionality associated with conventional operating aspects, and such conventional aspects will not be described in detail herein. Moreover, although FIG. 2 depicts certain elements as distinct blocks or modules, processing architecture 206 may include or incorporate additional functional components (or portions thereof) of mobile device 200, such as memory 208, cellular communication module 210, or wireless communication module 212.

User interface 202 may include, without limitation: a keypad; one or more navigation buttons; a microphone; a speaker; a touchpad; a joystick or other cursor pointing mechanism; or the like. Display element 204 is configured to visually display information to the user of mobile device 202. Display element 204 may be realized using any suitable display technology and technique, such as LCD. Moreover, user interface 202 may include or be configured to function as, without limitation: a touch screen (on display element 204); a stylus writing pad (on display element 204); or the like. User interface 202 and display element 204 enable the user of mobile telephone 200 to manipulate applications and features supported by mobile telephone 200 such as, for example, the call forwarding routine described herein. In this regard, display element 204 may be utilized to present one or more potential forward-to telephone numbers to the user, and mobile device 200 may be configured to select (via processing architecture 206) a designated forward-to telephone number in response to a user entry obtained at user interface 202.

In an example embodiment, processing architecture 206 may be realized with any number of hardware, software, and/or firmware components, and processing architecture 206 may include any number of logical or functional modules. Processing architecture 206 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

In practice, processing architecture 206 may be suitably configured to perform and/or support the various operations, features, techniques, functions, and operations described herein. In particular, processing architecture 206 may control, manage, or carry out a service discovery protocol or routine 216 to discover the presence of potential forward-to devices in the vicinity of mobile device 200. Processing architecture 206 is also suitably configured to control, manage, or perform the selection of a designated forward-to number in the manner described herein.

Memory 208 may be realized as RAM memory, flash memory, EPROM memory, EEPROM memory, registers, a hard disk, a removable disk, a CD-ROM, or any other form of storage medium known in the art. In this regard, memory 208 can be coupled to processing architecture 206 such that processing architecture 206 can read information from, and write information to, memory 208. In the alternative, memory 208 may be integral to processing architecture 206. As an example, processing architecture 206 and memory 208 may reside in an ASIC. In this example, memory 208 may be utilized to maintain a forwarding priority list 218 for mobile device 200 and/or to maintain a default forward-to telephone number 220 for mobile device 200. Memory 208 may also be utilized to store data associated with operation of the service discovery protocol 216 and information that may relate to conventional operating features of mobile device 200.

Cellular communication module 210 may represent processing logic, hardware, software, and/or firmware that is suitably configured to support wireless communication protocols, schemes, and techniques utilized by mobile device 200. In practice, cellular communication module 210 or a portion thereof may be considered to be part of processing architecture 206. In this example, cellular communication module 210 includes a suitably configured cellular radio that supports communication with a cellular network (see FIG. 1) using known techniques and technologies. A cellular radio may include any number of RF front end components, any number of antennas, any number of transmitters, any number of receivers, and/or any number of transceivers, depending upon the particular implementation. Cellular communication module 210 is generally configured to process data received or transmitted by the cellular radio. In accordance with the example embodiment of mobile device 200, cellular communication module 210 is suitably configured to generate call forwarding requests corresponding to designated forward-to telephone numbers, where the call forwarding requests are formatted for processing by a service provider network that supports mobile device 200.

Cellular communication module 210 may support any number of suitable wireless data communication protocols, techniques, or methodologies, including, without limitation: CDMA; GSM; and 3G-based protocols.

Wireless communication module 212 may represent processing logic, hardware, software, and/or firmware that is suitably configured to support wireless communication protocols, schemes, and techniques utilized by mobile device 200. In practice, wireless communication module 212 or a portion thereof may be considered to be part of processing architecture 206. In this example, wireless communication module 212 includes a suitably configured WLAN radio that supports communication with the WLAN in which mobile device 200 is located (see FIG. 1). In practice, a WLAN radio may include any number of RF front end components, any number of antennas, any number of transmitters, any number of receivers, and/or any number of transceivers, depending upon the particular implementation. Wireless communication module 212 is generally configured to process data received or transmitted by the WLAN radio. In accordance with the example embodiment of mobile device 200, wireless communication module 212 is suitably configured to support a service discovery routine that utilizes a non-cellular wireless communication protocol to detect a number of potential forward-to devices in the local operating vicinity of mobile device 200.

Wireless communication module 212 may support any number of suitable wireless data communication protocols, techniques, or methodologies, including, without limitation: Bluetooth; ZigBee (and other variants of the IEEE 802.15 protocol); IEEE 802.11 (any variation); IEEE 802.16 (WiMAX or any other variation); wireless home network communication protocols; and proprietary wireless data communication protocols such as variants of Wireless USB. In the example embodiment, cellular communication module 210 transmits call forwarding requests using one wireless communication protocol, while wireless communication module 212 transmits data intended for potential forward-to devices and/or intended for WLAN infrastructure components using a different wireless communication protocol.

Figure 3:
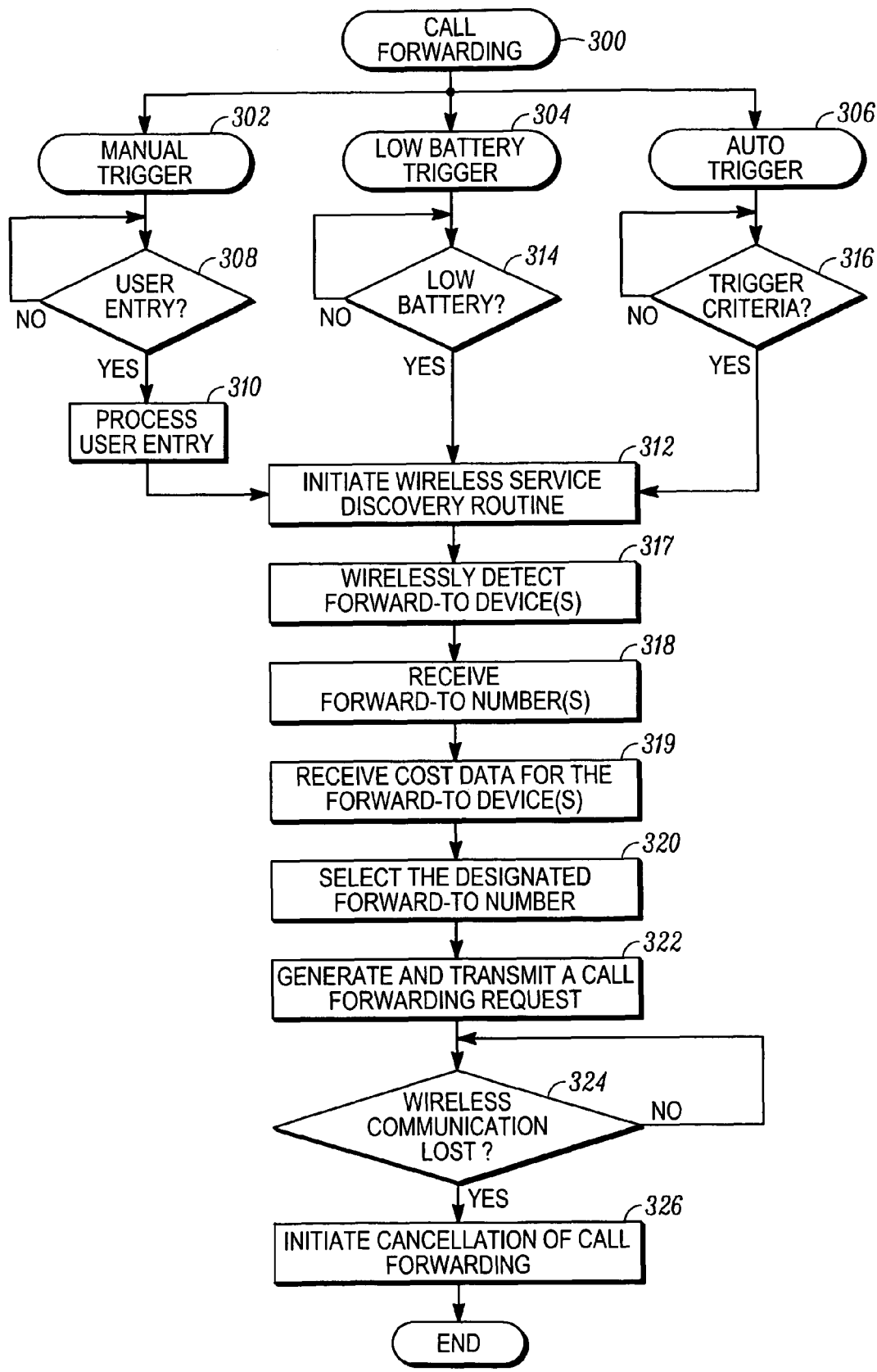
FIG. 3 is a flow chart of an example call forwarding process.

FIG. 3 is a flow chart of an example call forwarding process 300, which may be performed by a mobile device such as mobile device 102 or mobile device 200. Process 300 assumes that the mobile device, the potential forward-to devices, and the operating environment support the necessary functionality. The various tasks performed in connection with process 300 may be performed by software, hardware, firmware, or any combination thereof. For illustrative purposes, the following description of process 300 may refer to elements mentioned above in connection with FIG. 1 and FIG. 2. In practical embodiments, portions of process 300 may be performed by different elements of the described system, e.g., processing architecture 206, cellular communication module 210, or wireless communication module 212. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein.

Call forwarding process 300 can be performed when the mobile device is in a WLAN environment. Process 300 attempts to discover the presence of compatible forward-to devices in the vicinity of the mobile device. A suitable wireless service discovery routine can be initiated in any appropriate way, and process 300 contemplates three possible triggering scenarios: a manual trigger 302; a low battery trigger 304; and an automatic trigger 306 (an example embodiment may employ additional and/or alternative triggering mechanisms). One or more of the trigger mechanisms can be concurrently active, allowing process 300 to be initiated in response to different operating conditions and/or criteria.

If the service discovery routine is subject to manual triggering 302, then call forwarding process 300 may perform a query task 308 to monitor for a user entry at the mobile device. The user entry may represent manipulation of the user interface of the mobile device, e.g., a button press, a voice command, a soft key selection, or the like. If an appropriate user entry is not detected, then process 300 may exit or query task 308 may be re-entered to continue monitoring for such a user entry. If an appropriate user entry is detected, then the mobile device will process the user entry (task 310) as a trigger and initiate the wireless service discovery routine (task 312).

If the service discovery routine is subject to low battery triggering 304, then call forwarding process 300 may perform a query task 314 to monitor a battery status of the mobile device. If the battery status indicates a low battery condition, then the mobile device may initiate the service discovery routine (task 312). The actual threshold battery condition may be selected to anticipate a point where the mobile device can no longer maintain communication with the cellular network. In other words, the call forwarding procedure can be automatically initiated such that the user will continue to receive incoming calls directed to the mobile device even though the battery in the mobile device is drained or nearly drained. If the current battery status does not indicate a low battery condition, then process 300 may exit or query task 314 may be re-entered to continue monitoring the battery status.

If the service discovery routine is subject to automatic triggering 306, then call forwarding process 300 may perform a query task 316 to determine whether certain automatic triggering criteria has been met. If an automatic triggering condition is detected, then process 300 may initiate the service discovery routine (task 312). Such an automatic trigger may be performed whenever the mobile device enters a compatible WLAN environment. For example, the mobile device may be configured to transmit periodic beacons or other signals to provoke automatic device discovery. If the mobile device does not detect an automatic triggering condition, then process 300 may exit or query task 316 may be re-entered to continue monitoring for an automatic triggering state.

As mentioned above, in an example embodiment, the mobile device may support more than one triggering mechanism. Thus, manual triggering 302, low battery triggering 304, and automatic triggering 306 may be concurrently performed such that the wireless service discovery routine is initiated whenever any one of the triggering conditions is satisfied.

As mentioned previously, the wireless service discovery routine utilizes a first wireless communication protocol, while the mobile device utilizes a second wireless communication protocol for cellular network communication. In example embodiments the service discovery protocol is compliant with UPnP, Zero Configuration Networking, and/or the BONJOUR discovery technology by Apple Computer, Inc. During the service discovery routine, call forwarding process 300 wirelessly detects (task 317) a number of potential forward-to devices within the local operating vicinity of the mobile device. Task 317 may leverage known discovery technologies and techniques that enable the mobile device to discover the presence of compatible forward-to devices and to obtain information about such forward-to devices. In this regard, task 317 may represent the exchange of data (using an IEEE 802.11 link, a BLUETOOTH PAN link, or the like) between the mobile device and the potential forward-to devices.

Also during the service discovery routine, call forwarding process 300 processes one or more potential forward-to telephone numbers and processes a designated forward-to telephone number for the mobile device. In this example, the mobile device receives one or more forward-to telephone numbers (task 318) corresponding to one or more potential forward-to devices, and one of the potential forward-to telephone number(s) will be the designated forward-to number for purposes of call forwarding. Referring to FIG. 2, wireless communication module 212 may be configured to receive the potential forward-to telephone numbers from the potential forward-to devices. If a plurality of potential forward-to telephone numbers is received, then the mobile device may prepare or otherwise obtain a list of forward-to telephone numbers for processing.

In accordance with one example embodiment, the service discovery mechanism is also utilized to obtain cost data for services associated with the potential forward-to devices. In this regard, call forwarding process 300 may receive the cost data (task 319), which can be utilized as selection criteria for the forward-to telephone number (described in more detail below). The cost data may represent a per-minute charge for calls, per-call service fees, roaming charges, long distance rates, account status for the user of the mobile device, or the like.

Referring again to FIG. 1, the service discovery protocol may be carried out between mobile device 102 and a suitably configured mobile forward-to device such as PDA 110 or mobile telephone 112. If the forward-to devices are mobile devices that also support the particular service discovery protocol and the local wireless transport mechanism, then no additional communication device, interface, or translator is necessary. Such devices may be configured to directly provide their respective telephone numbers and other information as needed. The service discovery protocol may also be carried out between mobile device 102 and a software-based phone application resident on desktop computer 114 or portable computer 118. Assuming that portable computer 118 supports the particular service discovery protocol and includes a suitably configured WLAN card or hardwired IP-based connection, then no additional communication device, interface, or translator is necessary. These computer deployments may utilize IP based caller ID methodologies to convey the telephone number data, or the respective software applications can be configured to provide the telephone number data upon request during the service discovery routine. The service discovery protocol may also be carried out between mobile device 102 and a suitably configured fixed line telephone 116. In one embodiment, a conventional fixed line telephone 116 may cooperate with an adapter, a pass-through device, or other component that provides the WLAN transport mechanism. The telephone number data for fixed line telephone 116 may be extracted using caller ID methodologies, or fixed line telephone 116 may be configured with the telephone number data. Alternatively, fixed line telephone 116 may be an integrated dual-mode device that supports both WLAN communication and traditional PSTN communication. In yet another embodiment, PSTN connectivity may be integrated into a wireless access point, a router, or other WLAN infrastructure device or component located in the operating environment 200.

The mobile device is suitably configured to select a designated forward-to telephone number (task 320) in an appropriate manner. The selection technology and technique may be tailored to suit the needs of the particular operating environment, the particular mobile device, and/or user preferences. A number of selection techniques are described below in connection with FIG. 4.

Once a designated forward-to telephone number has been selected, call forwarding process 300 may generate and transmit a call forwarding request that corresponds to the designated forward-to telephone number (task 322). Referring to FIG. 2, cellular communication module 210 may be configured to generate and transmit the call forwarding request. In this regard, cellular communication module 210 may format the call forwarding request for processing by a service provider network (e.g., a cellular network) that supports the mobile device. Thus, the mobile device can transmit the call forwarding request using a cellular communication protocol. In example embodiments, the generation, transmission, and handling of the call forwarding request may be carried out in accordance with known technologies and techniques. Assuming that the call forwarding request is received and processed by the cellular network, incoming calls placed to the mobile device will now be forwarded to the designated forward-to device.

Although not depicted in FIG. 3, a triggering mechanism (which may utilize some or all of the trigger conditions described above) may additionally or alternatively be utilized to control the timing of the generation and transmission of call forwarding requests by the mobile device. In other words, the mobile device may perform the service discovery routine (task 312) and obtain a designated forward-to device as described above, but delay transmission of the actual call forwarding request until one of the triggering conditions is satisfied.

The forwarded status of the mobile device can be maintained indefinitely, until the cellular service provider is instructed to cancel the call forwarding state. In one example embodiment, the user of mobile device can instruct the mobile device to generate a suitable call forward cancellation request or signal. Alternatively, cancellation of call forwarding may be initiated in response to certain criteria. For example, call forwarding process 300 may perform a query task 324 to determine whether the mobile device has lost local wireless communication with the designated forward-to device. If not, then process 300 may exit or query task 324 may be re-entered such that the mobile device continues to monitor the wireless communication link between the mobile device and the designated forward-to device. If process 300 detects loss of wireless communication, then the mobile device may initiate cancellation (task 326) of call forwarding to the designated forward-to device. In practice, the mobile device can initiate cancellation of call forwarding by automatically generating a call forward cancellation request in response to the loss of wireless communication with the designated forward-to device.

Figure 4:
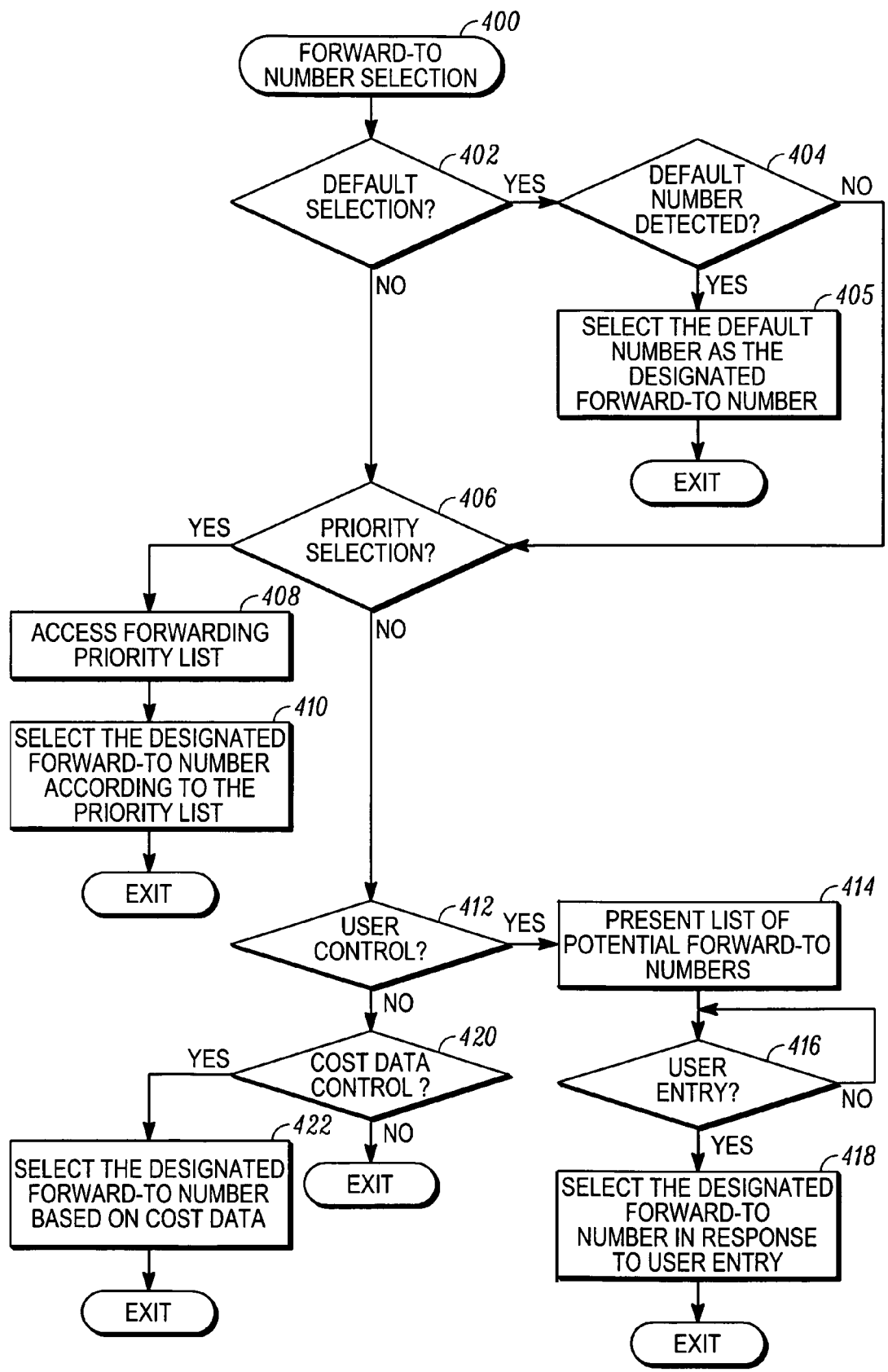
FIG. 4 is a flow chart of an example forward-to number selection procedure.

As described above, call forwarding process 300 selects the designated forward-to telephone number in response to the information obtained during the wireless service discovery routine (see task 320). In this regard, FIG. 4 is a flow chart of an example forward-to number selection procedure 400 that may be utilized for task 320. The various tasks performed in connection with process 400 may be performed by software, hardware, firmware, or any combination thereof. For illustrative purposes, the following description of process 400 may refer to elements mentioned above in connection with FIG. 1 and FIG. 2. In practical embodiments, portions of process 400 may be performed by different elements of the described system, e.g., user interface 202, display element 204, processing architecture 206, or memory 208. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

In one embodiment, the mobile device can be configured with a default forward-to telephone number, such as the user's fixed line home number, the user's direct office number, or the like. For example, the mobile device may maintain the default forward-to number in its memory (see FIG. 2). If the mobile device supports a default selection feature (query task 402), then forward-to number selection process 400 may proceed to a query task 404. Otherwise, process 400 may proceed to a query task 406. In this example, query task 404 determines whether the potential forward-to telephone number(s) obtained during the service discovery routine includes the default forward-to telephone number. If so, then process 400 may select the default forward-to telephone number (task 405) for use as the designated forward-to telephone number. In practice, therefore, the mobile device may retrieve the designated forward-to telephone number from memory element 208 (see FIG. 2) for purposes of generating the call forwarding request. The selection of the default forward-to telephone number is one way in which the processing architecture of the mobile device can automatically select the designated forward-to telephone number. Alternatively, task 405 may require a user confirmation prior to actually selecting the default number. If query task 404 detects that the list of potential forward-to telephone numbers (where the list may include one or more numbers) does not include the default forward-to telephone number, then process 400 may proceed to query task 406.

The mobile device may also maintain a forwarding priority list in its memory (see FIG. 2). The forwarding priority list includes a plurality of telephone numbers listed in some order of priority, or it includes a plurality of telephone numbers along with corresponding priority data that indicates their relative priority. In this regard, the forward priority list may include the default forward-to number as the first priority entry, a second number as the next highest priority, and so on. Thus, if the first priority number is not received during the service discovery procedure, the mobile device will consider the second number, then the third number, and so on.

If the mobile device supports a priority selection feature (query task 406), then forward-to number selection process 400 may proceed to a task 408. Otherwise, process 400 may proceed to a query task 412. In this example, task 408 represents the mobile device accessing the forwarding priority list for analysis. Process 400 can then select the designated forward-to telephone number in response to the accessed forward priority list (task 410). Task 410 enables the mobile device to select an available forward-to number having the highest priority. If the service discovery routine did not discover any numbers on the forward priority list, then task 410 may exit or cause process 400 to be re-entered at an appropriate point. The selection of a priority forward-to telephone number is one way in which the processing architecture of the mobile device can automatically select the designated forward-to telephone number. Alternatively, task 410 may require a user confirmation prior to actually selecting the highest priority telephone number.

The mobile device can also be configured to enable the user to control the selection of the designated forward-to telephone number. If the mobile device supports such user control (query task 412), then forward-to number selection process 400 may proceed to a task 414. In this example, task 414 presents a list of the potential forward-to telephone numbers to the user. Task 414 may represent the displaying of the potential forward-to numbers, the printing of a list of the potential forward-to numbers, the playing of an audible listing of the potential forward-to numbers, or the like. If a user entry or selection is detected (query task 416), then process 400 may proceed to a task 418. Otherwise, query task 416 may be re-entered to wait for such a user entry. During task 418, the mobile device selects the designated forward-to telephone number in response to the user entry. In other words, this option enables the user of the mobile device to manually select one of the potential forward-to numbers for the call forwarding request.

If the mobile device does not support user control, then forward-to number selection process 400 may perform a query task 420. In one embodiment, the mobile device can be configured with a cost analysis feature that controls the selection of the forward-to telephone number. This feature may be desirable if the user wishes to forward calls to a telephone number corresponding to the cheapest available service. If the mobile device supports the cost data selection feature (query task 420), then process 400 may proceed to a task 422. Otherwise, process 400 may exit or be re-entered at an appropriate point. In this example, task 422 represents the selection of the designated forward-to telephone number in response to cost data, which may be received during the service discovery procedure. The selection of the designated forward-to telephone number in this manner is yet another way in which the processing architecture of the mobile device can automatically select the designated forward-to telephone number. Alternatively, task 422 may require a user confirmation prior to actually selecting the default number.

In practice, a mobile device may support any number of the selection methodologies described above, and any given selection methodology may be overridden by the user of the mobile device. For example, even if a default forward-to telephone number is detected, the user may instead wish to forward calls to a different number (such as a number that results in cheaper service). Moreover, a mobile device may be configured to support additional selection methodologies not depicted in FIG. 4.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A call forwarding method for a mobile device, the method comprising:

wirelessly detecting, with the mobile device, a number of potential forward-to devices within a local operating vicinity of the mobile device;

processing, with the mobile device, a designated forward-to telephone number corresponding to one of the potential forward-to devices; and wirelessly transmitting, from the mobile device, a call forwarding request corresponding to the designated forward-to telephone number, the call forwarding request being formatted for processing by a service provider network that supports the mobile device.

2. A call forwarding method according to claim 1, wherein processing the designated forward-to telephone number comprises receiving, at the mobile device, the designated forward-to telephone number from one of the potential forward-to devices.

3. A call forwarding method according to claim 1, wherein processing the designated forward-to telephone number comprises retrieving the designated forward-to telephone number from a memory element maintained for the mobile device.

4. A call forwarding method according to claim 1, further comprising initiating, with the mobile device, a service discovery protocol, wherein wirelessly detecting the number of potential forward-to devices is performed during the service discovery protocol.

5. A call forwarding method according to claim 4, wherein processing the designated forward-to telephone number is performed during the service discovery protocol.

6. A call forwarding method according to claim 4, wherein the service discovery protocol is compliant with UPnP.

7. A call forwarding method according to claim 4, wherein the service discovery protocol is compliant with Zero Configuration Networking.

8. A call forwarding method according to claim 4, wherein the service discovery protocol is compliant with the Bonjour discovery technology.

9. A call forwarding method according to claim 1, wherein processing the designated forward-to telephone number comprises:

receiving, at the mobile device, a plurality of forward-to telephone numbers from a plurality of potential forward-to devices; and selecting, with the mobile device, one of the plurality of forward-to telephone numbers for use as the designated forward-to telephone number.

10. A call forwarding method according to claim 9, wherein selecting one of the plurality of forward-to telephone numbers is responsive to a user entry at the mobile device.

11. A call forwarding method according to claim 9, wherein selecting one of the plurality of forward-to telephone numbers comprises:

determining, with the mobile device, whether the plurality of forward-to telephone numbers includes a default forward-to telephone number; and if the plurality of forward-to telephone numbers includes the default forward-to telephone number, selecting the default forward-to telephone number for use as the designated forward-to telephone number.

12. A call forwarding method according to claim 9, wherein selecting one of the plurality of forward-to telephone numbers is responsive to a forwarding priority list maintained for the mobile device.

13. A call forwarding method according to claim 1, wherein the designated forward-to number corresponds to a designated forward-to device, and wherein the method further comprises:

detecting, with the mobile device, loss of wireless communication with the designated forward-to device; and initiating, with the mobile device, cancellation of call forwarding to the designated forward-to device in response to the loss of wireless communication.

14. A call forwarding method according to claim 1, further comprising monitoring, with the mobile device, a battery status of the mobile device, wherein generating the call forwarding request is triggered when the battery status indicates a low battery condition.

15. A call forwarding method according to claim 1, further comprising:
   receiving, at the mobile device, a plurality of forward-to telephone numbers from a plurality of potential forward-to devices;
   receiving, at the mobile device, cost data for services associated with the plurality of potential forward-to devices; and
   selecting, with the mobile device and based upon the cost data, one of the plurality of forward-to telephone numbers for use as the designated forward-to telephone number.

16. A call forwarding method for a mobile device, the method comprising:
   initiating, with the mobile device, a service discovery routine in a local operating vicinity of the mobile device, the service discovery routine utilizing a first wireless communication protocol;
   obtaining, at the mobile device during the service discovery routine, a list of forward-to telephone numbers corresponding to one or more potential forward-to devices;
   selecting, with the mobile device, a designated forward-to telephone number from the list of forward-to telephone numbers; and
   transmitting, from the mobile device and utilizing a second wireless communication protocol, a call forwarding request corresponding to the designated forward-to telephone number, the call forwarding request being formatted for processing by a service provider network that supports the mobile device.

17. A call forwarding method according to claim 16, wherein initiating a service discovery routine is triggered by a user entry at the mobile device.

18. A call forwarding method according to claim 16, wherein selecting the designated forward-to telephone number comprises:
   determining, with the mobile device, whether the list of forward-to telephone numbers includes a default forward-to telephone number; and
   if the list of forward-to telephone numbers includes the default forward-to telephone number, selecting the default forward-to telephone number for use as the designated forward-to telephone number.

19. A call forwarding method according to claim 16, wherein selecting the designated forward-to telephone number is responsive to a forwarding priority list maintained for the mobile device.

20. A call forwarding system for a mobile device, the call forwarding system comprising:
   a first wireless communication module of the mobile device, the first wireless communication module configured to support a service discovery routine that utilizes a first wireless communication protocol to wirelessly detect a number of potential forward-to devices in a local operating vicinity of the mobile device;
   a processing architecture of the mobile device, the processing architecture coupled to the first wireless communication module and configured to select a designated forward-to telephone number corresponding to one of the potential forward-to devices; and
   a second wireless communication module of the mobile device, the second wireless communication module configured to generate and wirelessly transmit a call forwarding request corresponding to the designated forward-to telephone number, the call forwarding request being formatted for processing by a service provider network that supports the mobile device.

21. A system according to claim 20, the second wireless communication module being configured to transmit the call forwarding request utilizing a second wireless communication protocol.

22. A system according to claim 20, the first wireless communication module being configured to receive the designated forward-to telephone number from one of the potential forward-to devices.

23. A system according to claim 20, further comprising a user interface for the mobile device, wherein the processing architecture is configured to select the designated forward-to telephone number in response to a user entry at the user interface.

24. A system according to claim 20, the processing architecture being configured to automatically select the designated forward-to telephone number.

25. A system according to claim 24, the processing architecture being configured to automatically select the designated forward-to telephone number in response to a forwarding priority list maintained for the mobile device.

* * * * *